(12) United States Patent
Lee

(10) Patent No.: US 10,500,928 B2
(45) Date of Patent: Dec. 10, 2019

(54) AIR VENT FOR A VEHICLE

(71) Applicant: NIFCO KOREA INC., Anson-si, Chungcheongnam-do (KR)

(72) Inventor: Young Gook Lee, Asan (KR)

(73) Assignee: NIFCO KOREA INC., Ansan (KR)

( * ) Notice: Subject to any disclaimer, the term of this patent is extended or adjusted under 35 U.S.C. 154(b) by 33 days.

(21) Appl. No.: 15/513,920

(22) PCT Filed: Sep. 23, 2015

(86) PCT No.: PCT/KR2015/010022
§ 371 (c)(1),
(2) Date: Jan. 3, 2019

(87) PCT Pub. No.: WO2016/048038
PCT Pub. Date: Mar. 31, 2016

(65) Prior Publication Data
US 2019/0118620 A1    Apr. 25, 2019

(30) Foreign Application Priority Data
Sep. 24, 2014  (KR) ........................ 10-2014-0127873

(51) Int. Cl.
*B60H 1/34* (2006.01)
(52) U.S. Cl.
CPC .......... *B60H 1/3421* (2013.01); *B60H 1/345* (2013.01); *B60H 2001/3478* (2013.01)
(58) Field of Classification Search
CPC .................. B60H 1/3421; B60H 1/345; B60H 2001/3478

USPC ......................................................... 454/155
See application file for complete search history.

(56) References Cited

U.S. PATENT DOCUMENTS

| 7,018,288 B2 * | 3/2006 | Okada ................. B60H 1/3421 454/155 |
| 9,555,692 B2 * | 1/2017 | Shibata ............... B60H 1/3421 |
| 2003/0022615 A1 * | 1/2003 | Hanft .................. B60H 1/3421 454/155 |
| 2004/0092225 A1 * | 5/2004 | Gehring ............... B60H 1/3421 454/155 |
| 2005/0239391 A1 * | 10/2005 | Shibata ................ B60H 1/3421 454/155 |

FOREIGN PATENT DOCUMENTS

| DE | 202005012570 U1 | 10/2005 |
| DE | 202007010190 U1 | 10/2007 |
| DE | 102009003816 B3 | 6/2010 |
| EP | 1033269 A1 | 9/2000 |
| JP | H06211040 A | 8/1994 |
| JP | H11180140 A | 7/1999 |
| JP | H11278046 A | 10/1999 |
| JP | 2003-3106636 A | 4/2003 |
| KR | 2003-0008925 A | 1/2003 |
| WO | 2011101123 A1 | 8/2011 |

* cited by examiner

*Primary Examiner* — Helena Kosanovic
(74) *Attorney, Agent, or Firm* — Porter, Wright, Morris & Arthur, LLP

(57) ABSTRACT

The present invention relates to an air vent for a vehicle, the air vent enabling adjusting of an air discharge direction of an air vent, which is for supplying the outside air to the inside of a vehicle, to various angles as well as diffusing the air being discharged.

3 Claims, 6 Drawing Sheets

AIR VENT FOR A VEHICLE

BACKGROUND OF THE INVENTION

Technical Field

The present invention relates to an air vent for a vehicle, in which the air discharge direction of an air vent, which is to supply outside air to the inside of a vehicle, can be adjusted at various different angles and the air to be discharged can be diffused.

Background Art

In general, an air vent for a vehicle, which has been typically used for supplying outside air to the inside of a vehicle, includes a plurality of rear vanes provided to be arranged in the vertical direction at the front side in an air vent housing, which has a discharge hole at the front side, a plurality of front vanes provided to be arranged in the right and left directions at the rear side in the air vent housing, and wind direction adjustment knobs are connected and provided to the rear vanes and the front vanes so as to move the rear vanes and the front vanes in the right and left directions and vertical direction.

According to the prior art vehicle air vent, each of the rear vanes is inclined upwards or downwards as the wind direction adjustment knob is moved in the upward or downward direction such that the air discharged through the discharge hole of the air vent housing is adjusted in the up and down directions, and each of the front vanes is inclined to the right or left as the wind direction adjustment knob is moved in the right or left direction such that the air discharged through the discharge hole of the air vent housing is adjusted in the right and left directions.

Meanwhile, referring to FIG. 1, Korean registered patent publication No. 10-1327614 discloses an air vent provided to a dashboard of a vehicle and having a rectangular shape so as to discharge the air from an air conditioner to the inside of a vehicle, which includes a discharge hole 111 provided at the front side thereof, a plurality of rear vane 120 arranged in the vertical direction at the front side in the air vent housing 110, a plurality of front vane 130 arranged in the horizontal direction at the rear side in the air vent housing 110, and a wind direction adjustment knob 140 connected to one of the rear vanes 120 and one of the front vanes 130 so as to adjust lateral wind direction and vertical wind direction.

In addition, a dial knob 150 is provided at one side of the air vent housing 110 and link-connected to a damper not shown provided to the inside of the housing so as to rotate the damper.

Furthermore, referring to FIG. 2, Korean registered patent publication No. 10-0862498 discloses an air vent, wherein a rear vane 120 has a hinge shaft 121 and an interlocking shaft 122, which are respectively formed at the front portion and the rear portion thereof, the hinge shaft 121 is assembled into a fixed link 112, which is fixed on a wall surface of the air vent housing and has a plurality of hinge holes, and the interlocking shaft 122 is assembled into an interlocking link not shown provided with a plurality of interlocking holes, such that, when a wind direction adjustment knob is rotated, the interlocking link at a rear side with respect to the hinge shaft 121 moves in the vertical direction and thus the plurality of rear vanes 120 rotate simultaneously.

However, the prior art air vent has disadvantages that since the air vent has simple constituent elements for simply blocking the air discharge or simply changing the direction of wind, which is discharged forwards, a user may feel a large difference in temperature between the windy and non-windy parts.

In addition, the prior art air vent has further disadvantage that, when a user manipulates the wind direction adjustment knob, the rear vanes move only in one direction, that is, in the upward or downward direction only and is likely to be concentrated on one position, and thus it takes a long time to convert the temperature in the vehicle to the temperature desired by the user.

PRIOR ART DOCUMENTS

Patent Document 1: Korean Patent Registration No. 10-1327614 registered on 4 Nov. 2013—Air Vent Apparatus for Vehicles Patent Document 2: Korean Patent Registration No. 10-0862498 registered on 1 Oct. 2008—Air Vent Structure for a Vehicle

SUMMARY OF THE INVENTION

Problems that the Invention is to Solve

Accordingly, the present invention has been derived to solve the above-mentioned problems and disadvantages occurring in the prior arts, and it is an objective of the present invention to provide an air vent for a vehicle, in which a rotation type dial knob is used in an air vent, which is in the shape of a rectangle, so as to open or close an air path or control the air velocity of the air to be discharged, and the angles of the rear vanes can be divisionally adjusted through the rotation type dial knob so as to diffuse the air during the discharge of the air.

It is another objective of the present invention to provide an air vent for a vehicle, in which wind direction can be controlled in the up and down directions and the diffusion of the wind direction can be smoothly carried out, while simplifying the manufacturing of required parts, thereby improving productivity and facilitating cost reduction.

Means for Solving the Problems

To accomplish the above objectives, according to the present invention, there is provided an air vent for a vehicle, includes:

a duct housing 10 having an air flow path formed therein and a air discharge hole 11 provided at the front side thereof;

a damper 15 positioned in the air flow path at the rear side of the duct housing 10;

a plurality of front vanes 20 arranged on spacers, which are provided to an upper end and a lower end in the front portion of the duct housing 10, so as to rotate in the right and left directions;

a plurality of rear vanes 30 positioned in front of the front vanes 20 and arranged on spacers, which are provided on a right side and a left side in the duct housing 10, so as to rotate in the vertical direction, and having interlocking shafts 32 further provided at the rear portions of hinge shafts 31 at one side of the rear vanes;

a vane knob 35 coupled to one of the rear vanes 30 and fitted with one of the front vanes 20 at an adjustment bar provided at the front end of the inside thereof, so as to rotate the rear vanes 30 in the right and left directions and rotate the front vanes 20 in the vertical direction;

a rear vane joint link 40 having rear vane link bars 41 for respectively connecting the interlocking shafts 32 of the plurality of rear vanes 3 so as to enable joint motion, and a rear vane operation bar 42 further assembled into the rear vane link bars 41 in such a manner that one end of the rear vane operation bar 42 is coupled by a pin to the rear vane interlocking shaft 32 at a position in the center of the rear vane link bars 41 and the other end thereof is provided with a rear vane movement pin 42a;

a damper joint link 50 having a rotation arm 51, of which one end is assembled into a side surface at the rear portion of the duct housing 10 so as to be coupled to the damper 15 and the other end is assembled into a dial link bar 52, which is positioned in a forward discharge hole direction at the outside of the duct housing 10 and has a damper rotation pin 52a at a front end thereof; and a dial assembly 60 having a dial support member 61 coupled to a side surface at the front portion of the duct housing 10, a dial knob 62 rotatably provided to the inside of the dial support member 61, and a rear vane cam hole 64 and a damper cam hole 65 formed next to each other in the rear surface of the dial knob 62 such that one end of the dial link bar 52 moves along the damper cam hole 65 and the one end of the rear vane operation bar 42, which is connected to the rear vane link bar 41, is coupled to the rear vane cam hole 64, thereby moving the dial link bar 52 and the rear vane link bar 41 by the rotation of the dial knob 62 in the horizontal direction.

In addition, the rear vane cam hole 64 and the damper cam hole 65 are respectively formed to have a damper-closing point 64a, 65a, a damper-opening point 64b, 65b and a rear vane-spreading point 64c, 65c, such that the dial knob 62 is rotated at the damper-closing point 64a, 65a, the damper rotation pin 52a is positioned at damper-opening point 65b and moves the dial link bar 52 in the horizontal direction so as to rotate the damper 15, and the rear vane movement pin 42a is placed at the position of the damper-opening point 64b without friction in the rear vane cam hole 64.

Furthermore, the rear vane cam hole 64 and the damper cam hole 65 are respectively formed to have the damper-closing point 64a, 65a, the damper-opening point 64b, 65b and the rear vane-spreading point 64c, 65c, and, when the dial knob 62 is rotated in a state, in which the damper rotation pin 52a and the rear vane movement pin 42a are positioned at the damper-opening points 64b, 65b, the rear vane movement pin 42a is positioned at the rear vane-spreading point 64c and moves the rear vane operation bar 42 in the horizontal direction so as to jointly move the rear vane link bar 41 such that the rear vanes 30 are changed to have symmetrical inclination with respect to the rear vane operation bar 42 and the damper rotation pin 52a is placed at the position of the rear vane-spreading point 65c without friction in the damper cam hole 65.

In the air vent for a vehicle according to the present invention, the discharge of wind is carried out by opening the damper through the rotation of the dial knob and wind can be diffused while being discharged, thereby improving the convenience of use.

In addition, the opening of the air flow path and the diffusion of discharged wind can be realized by operating the dial knob of the air vent such that the number of required parts can be reduced while increasing assembly and productivity, thereby contributing greatly to the cost reduction of the air vent.

BRIEF DESCRIPTION OF THE INVENTION

DETAILED DESCRIPTION OF THE PREFERRED EMBODIMENT

Hereinafter, reference will be now made in detail to the preferred embodiments of the present invention with reference to the attached drawings.

An air vent for a vehicle according to the present invention is derived to allow the air discharge direction of an air vent, which supplies outside air to the inside of a vehicle, to be adjusted at various different angles and diffuse the air to be discharged.

Figure 1:
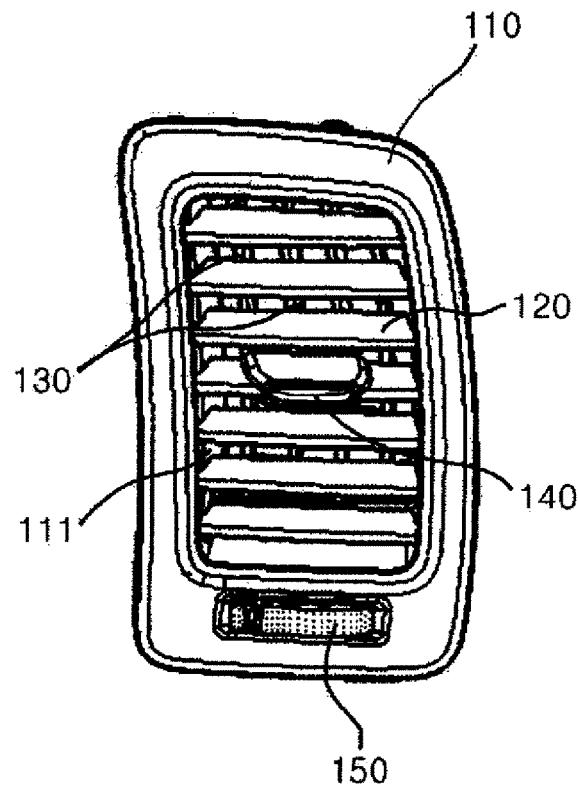
FIG. 1 is an exploded perspective view of a prior art air vent for a vehicle.
Figure 2:
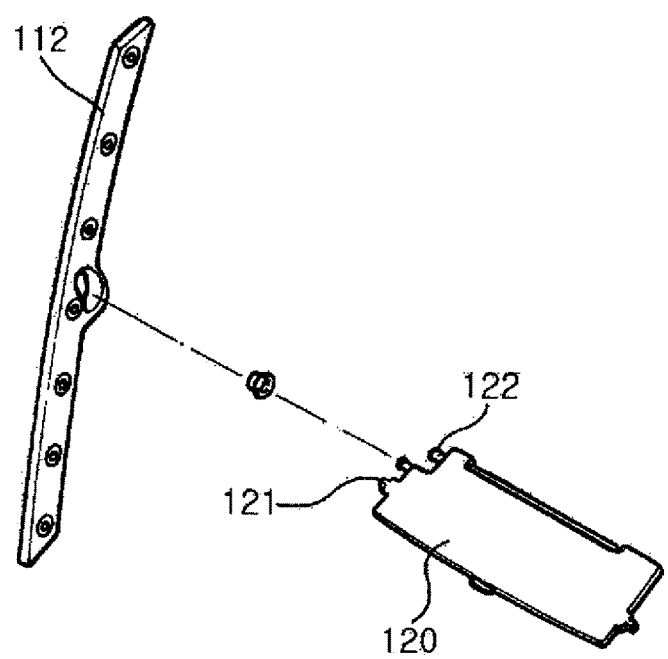
FIG. 2 is an exploded perspective view for showing prior art rear vanes.
Figure 3:
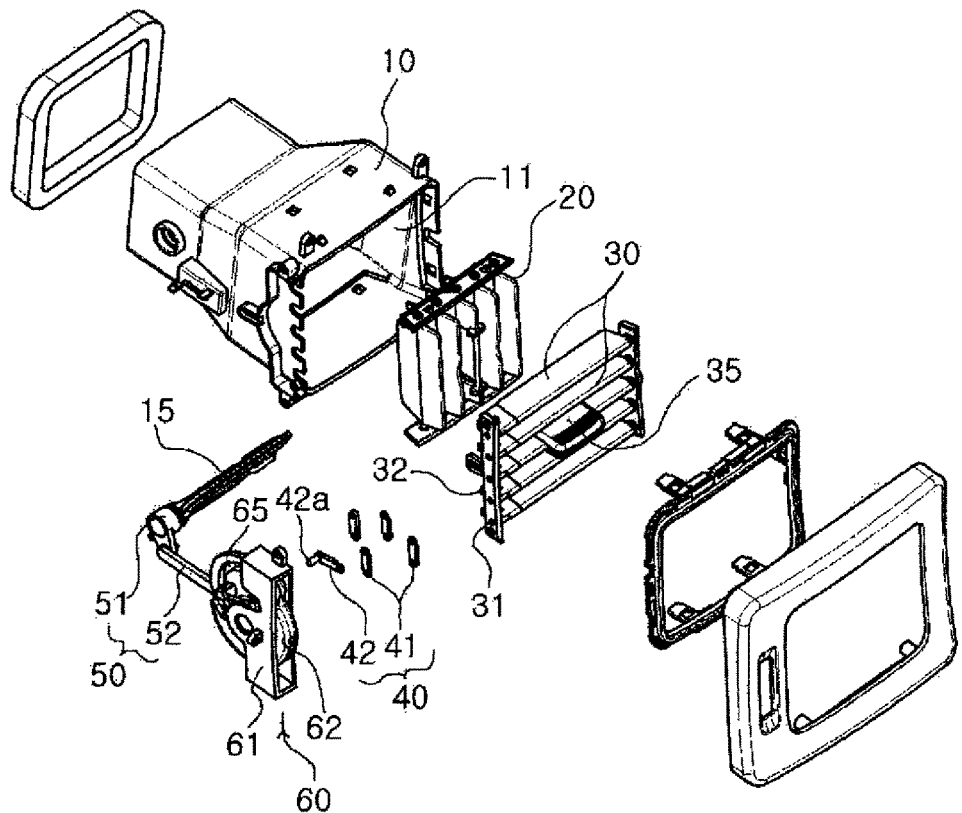
FIG. 3 is an exploded perspective view for illustrating the configuration of an air vent for a vehicle according to the present invention.
Figure 4:
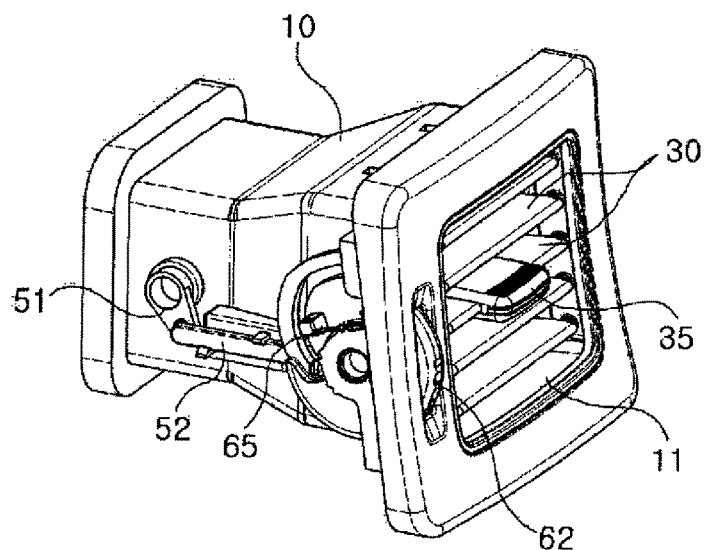
FIG. 4 is a perspective view for illustrating the air vent for a vehicle according to the present invention.

To this end, as shown in FIG. 3 and FIG. 4, an air vent for a vehicle, according to the present invention, includes:

a duct housing 10 having an air flow path formed therein and a air discharge hole 11 provided at the front side thereof;

a damper 15 positioned in the air flow path at the rear side of the duct housing 10;

a plurality of front vanes 20 arranged on spacers, which are provided to an upper end and a lower end in the front portion of the duct housing 10, so as to rotate in the right and left directions;

a plurality of rear vanes 30 positioned in front of the front vanes 20 and arranged on spacers, which are provided on a right side and a left side in the duct housing 10, so as to rotate in the vertical direction, and having interlocking shafts 32 further provided at the rear portions of hinge shafts 31 at one side of the rear vanes;

a vane knob 35 coupled to one of the rear vanes 30 and fitted with one of the front vanes 20 at an adjustment bar provided at the front end of the inside thereof, so as to rotate the rear vanes 30 in the right and left directions and rotate the front vanes 20 in the vertical direction;

a rear vane joint link 40 having rear vane link bars 41 for respectively connecting the interlocking shafts 32 of the plurality of rear vanes 3 so as to enable joint motion, and a rear vane operation bar 42 further assembled into the rear vane link bars 41 in such a manner that one end of the rear vane operation bar 42 is coupled by a pin to the rear vane interlocking shaft 32 at a position in the center of the rear vane link bars 41 and the other end thereof is provided with a rear vane movement pin 42a;

a damper joint link 50 having a rotation arm 51, of which one end is assembled into a side surface at the rear portion of the duct housing 10 so as to be coupled to the damper 15 and the other end is assembled into a dial link bar 52, which is positioned in a forward discharge hole direction at the outside of the duct housing 10 and has a damper rotation pin 52a at a front end thereof; and a dial assembly 60 having a dial support member 61 coupled to a side surface at the front portion of the duct housing 10, a dial knob 62 rotatably provided to the inside of the dial support member 61, and a rear vane cam hole 64 and a damper cam hole 65 formed next to each other in the rear surface of the dial knob 62 such that one end of the dial link bar 52 moves along the damper cam hole 65 and the one end of the rear vane operation bar 42, which is connected to the rear vane link bar 41, is coupled to the rear vane cam hole 64, thereby moving the dial link bar 52 and the rear vane link bar 41 by the rotation of the dial knob 62 in the horizontal direction.

In addition, a molding not shown and a bezel not shown may be provided to be coupled to the duct housing 10 at the front side of the rear vanes 30 so as to prevent internal components from being exposed to the outside, thereby gentrifying improving the air vent.

Figure 5A:
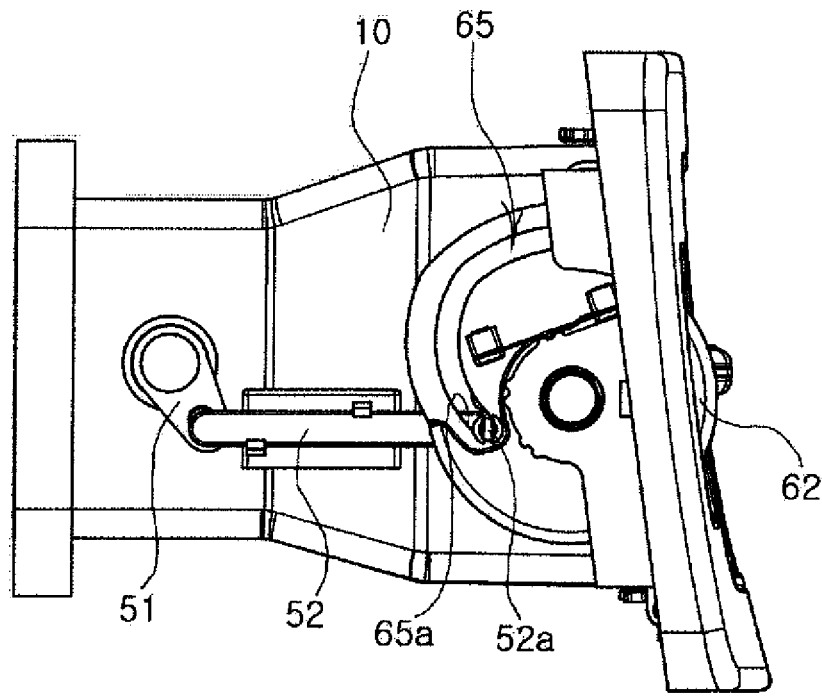
FIG. 5a is a front view for showing the air vent in a state, in which a damper is closed.
Figure 5B:
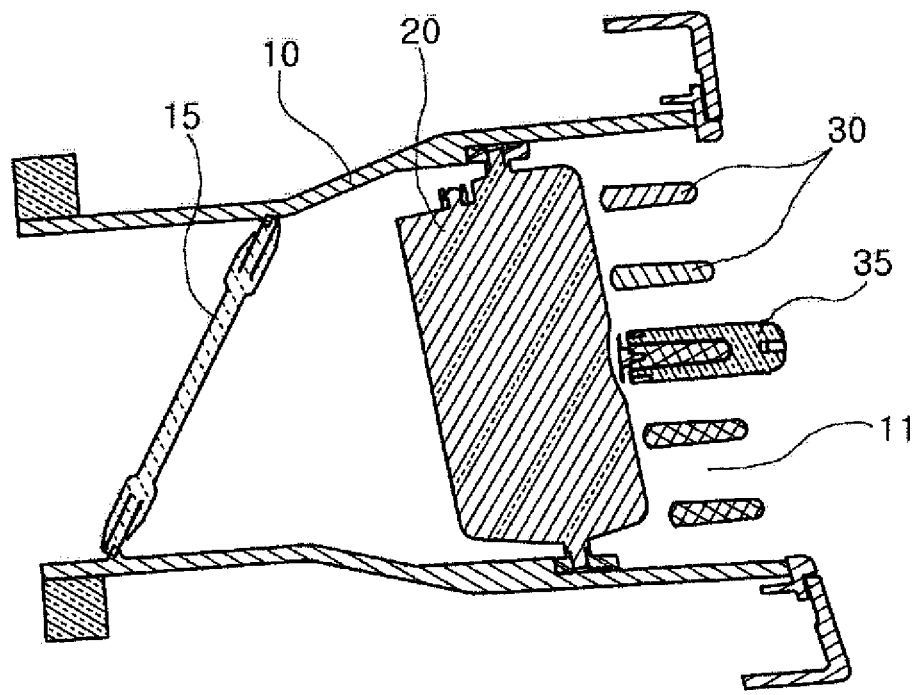
FIG. 5b is a cross-sectional view for showing the air vent in a state, in which the damper is closed.

Now, explaining the embodiments of the present invention, FIG. 5a and FIG. 5b show the air vent, in which the internal path of the duct housing 10 is closed by the damper such that no wind is discharged through the air discharge hole 11.

That is, FIG. 5a and FIG. 5b show a damper-closing state, in which the rear vane movement pin 42a is positioned at a damper-closing point 64a in the rear vane cam hole 64 of the dial knob 62 and the damper rotation pin 52a is positioned at a damper-closing point 65a in the damper cam hole 65.

Figure 6A:
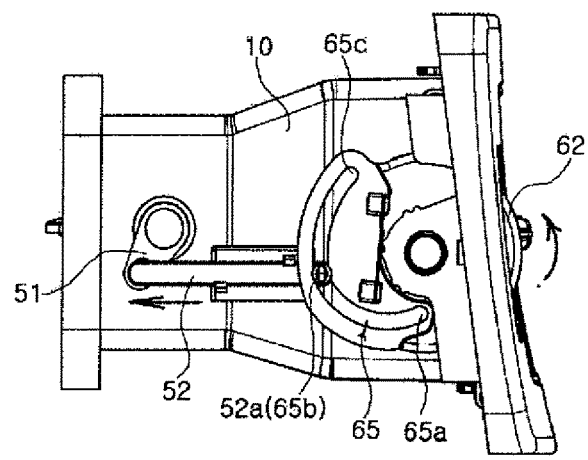
FIG. 6a is a front view for showing the air vent in a state, in which the damper is opened.

Herein, if the dial knob 62 is pushed upwards so as to rotate, as shown in FIG. 6a, then the damper rotation pin 52a positioned at the damper-closing point 65a in the damper cam hole 65 moves to a damper-opening point 65b, wherein the dial link bar 52, which is provided with the damper rotation pin 52a due to the shape of the damper cam hole 65 having a different center from the rotation shaft of the dial knob 62 moves to the left side on the drawing, thereby rotating the integrally formed rotation arm 51 and the damper 15

Figure 6B:
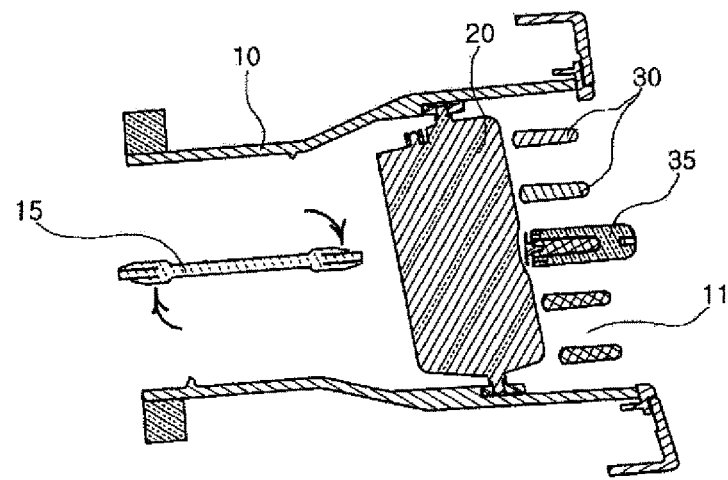
FIG. 6b is a cross-sectional view for showing the air vent in a state, in which the damper is opened.

Therefore, as shown in FIG. 6b, as the internal path of the duct housing 10 is opened by the rotation of the damper 15, air is discharged through the air discharge hole 11 at the front side thereof, such that left or right wind direction can be selected by the front vanes 20 or the upward or downward wind direction can be selected by the rear vanes 30.

Figure 7A:
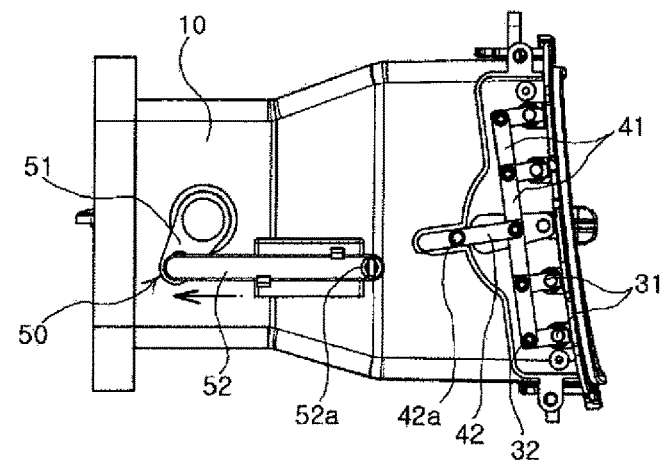
FIG. 7a is a front view for showing a rear blade joint link in a state, in which the damper is opened.

According to the present invention, as shown in FIG. 7a, the rear vane link bars 41 are coupled in such a manner that the hinge shafts 31 of the rear vanes 30 are coupled to the duct housing 10 and each one pair of the rear vanes 30 are connected to each other through the interlocking shafts 32, which are formed at the rear portions of the hinge shafts 31.

In addition, in the plurality of rear vanes 30, which can carry out joint motion by connecting each of the interlocking shafts 32 to the rear vane link bars 41, the rear vane operation bar 42 is further coupled to the center position of the rear vane link bars 41, wherein one end of the rear vane operation bar 42 is coupled by a pin to the rear vane interlocking shaft 32 at a position in the center of the rear vane link bars 41 and the other end thereof is provided with the rear vane movement pin 42a such that the rear vane movement pin 42a is fitted into the rear vane cam hole 64 of the dial knob 62.

Figure 7B:
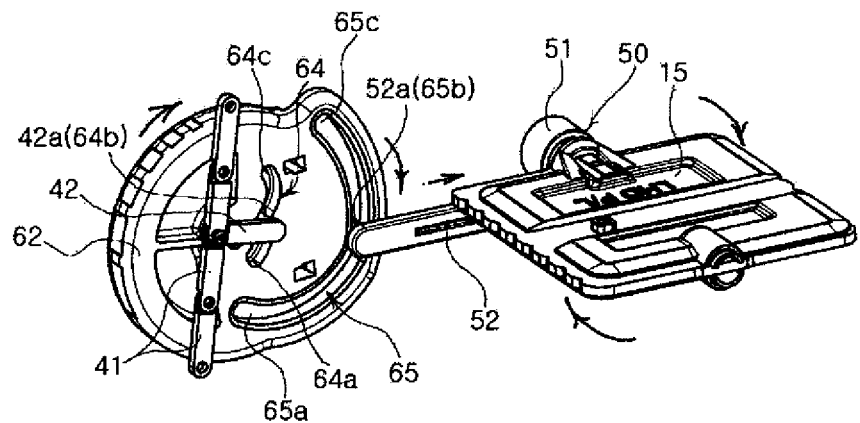
FIG. 7b is a perspective view for showing main parts in a state, in which the damper is opened and the joint link is unfolded.

Therefore, as shown in FIG. 7b, the dial knob 62 is rotated such that the damper rotation pin 52a is positioned at the damper-opening point 65b and, in this state, the rear vane movement pin 42a moves to the position of the damper-opening point 64b along the rear vane cam hole 64 without friction, such that the individual rotation of the rear vanes 30 is prevented in the operation in association with the opening of the damper.

Figure 8A:
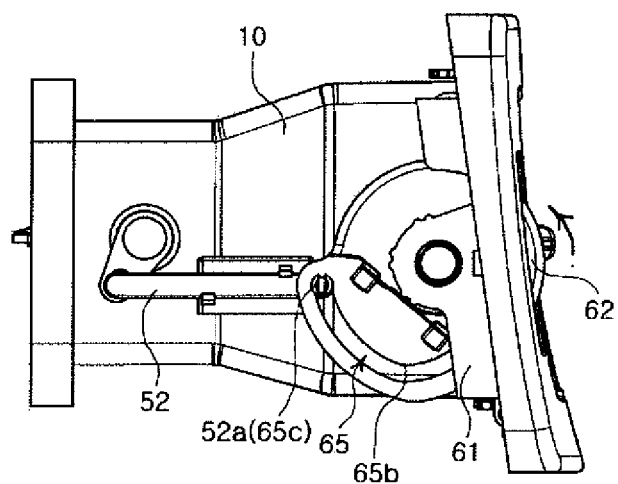
FIG. 8a is a front view for showing a state, in which the rear blade rotates with an inclination.
Figure 8B:
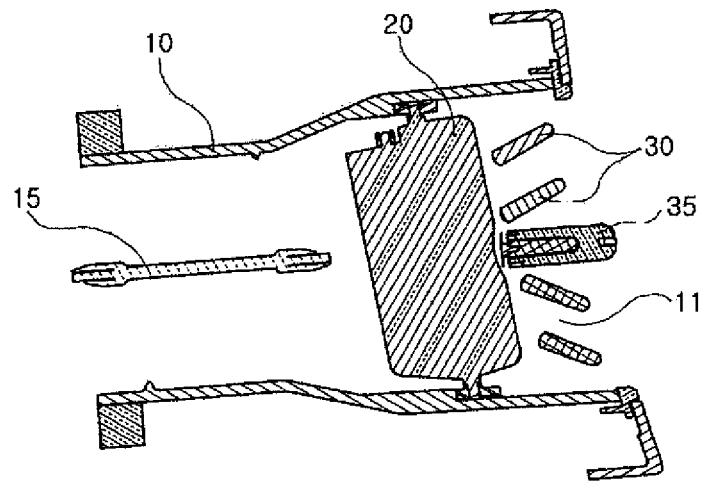
FIG. 8b is a cross-sectional view for showing the air vent in a state, in which the rear blade rotates with an inclination.

Furthermore, FIG. 8a and FIG. 8b show the air vent in a state, in which the angle of the rear vanes 30 is changed without the rotation of the damper 15 so as to diffuse the wind to be discharged. As shown in FIG. 8a and FIG. 8b, if the dial knob 62 is further pushed upwards so as to rotate, the damper rotation pin 52a, which is positioned at the damper-opening point 65b, is positioned in a rear vane-spreading point 65c direction without friction, and thus the damper joint link 50, in which the dial link bar 52 is included, does not move any more.

Figure 9A:
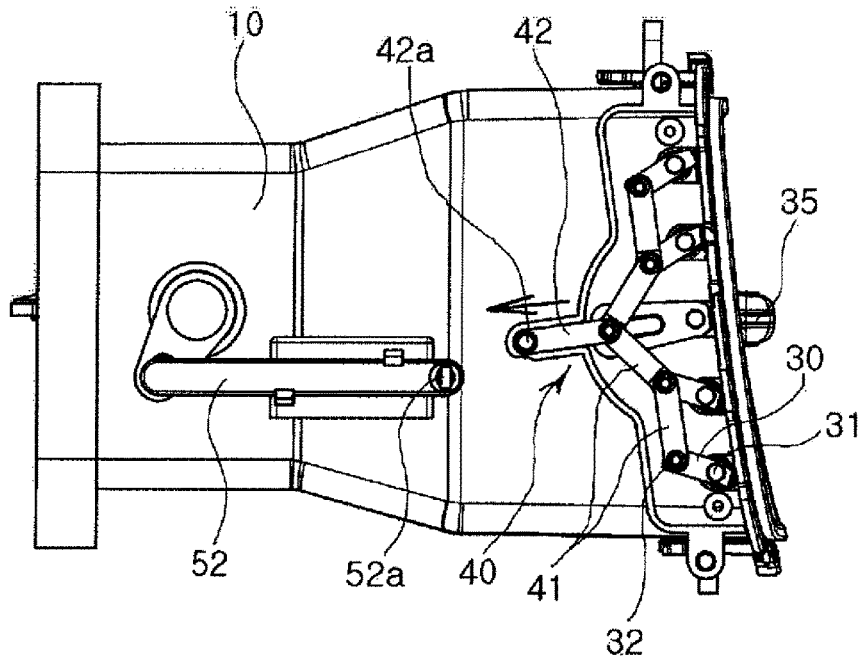
FIG. 9a is a front view for illustrating an operation state of the rear blade joint link.
Figure 9B:
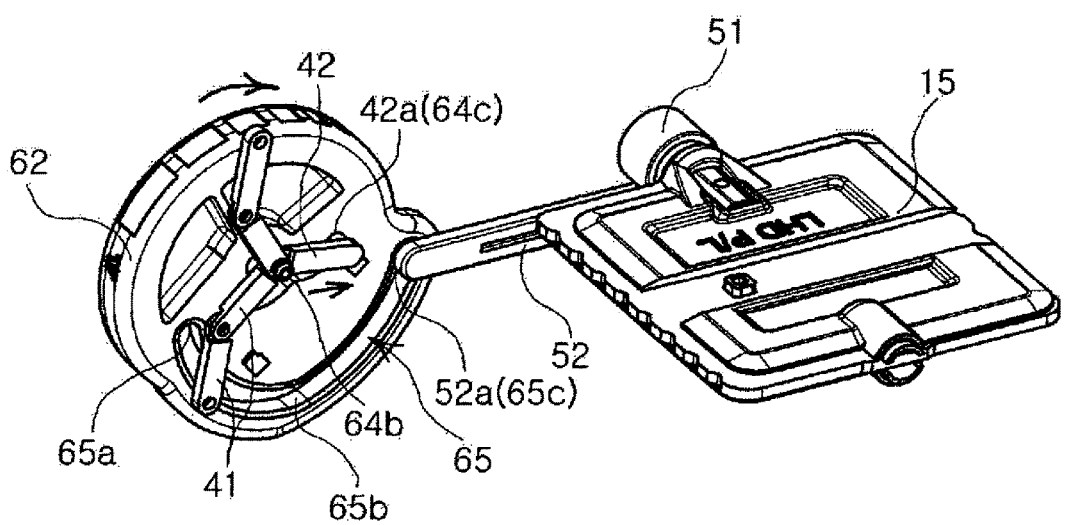
FIG. 9b is a perspective view for showing main parts in a state, in which the damper is opened and the joint link is folded.

Explaining the operation of the rear vane joint link 40 due to the rotation of the dial knob 62, as shown in FIG. 9a and FIG. 9b, when the rear vane operation bar 42 horizontally moves backwards by the rear vane movement pin 42a, which is moved from the damper-opening point 64b to the rear vane-spreading point 64c, the rear vane link bars 41 pull the rear vane operation bar 42 with respect to the center portion where the rear vane operation bar 42 is coupled.

Herein, the rear vane 30 in the center position is located on the same horizontal line as the rear vane operation bar 42 and does not carry out rotation, and the rear vane link bar 41 is pulled with respect to this rear vane and rotates the rear vanes 30 at the upper and lower portions with respect thereto, such that the wind is diffused while being discharged, as shown in FIG. 8b.

That is, while the wind is discharged forwards as the damper joint link 50 opens the damper 15 by the rotation of the dial knob 62, if the dial knob 62 is further rotated so as to operate the rear vane joint link 40 and induce the discharged wind to the rear vanes 30, then the wind is diffused during the discharge. Therefore, a user can control the wind discharge, the wind direction change, and the diffusion of the discharge wind by simply manipulating the dial knob 62.

It would be apparent to a person skilled in the art that the present invention described hereinabove is not to be limited to the foregoing description, and various replacements, modifications, and changes could be made without departing from the scope of the present invention.

What is claimed is:
1. An air vent for a vehicle, comprising:
   a duct housing (10) having an air flow path formed therein and a air discharge hole (11) provided at the front side thereof;
   a damper (15) positioned in the air flow path at the rear side of the duct housing (10);
   a plurality of front vanes (20) arranged on spacers, which are provided to an upper end and a lower end in the front portion of the duct housing (10), so as to rotate in the right and left directions;
   a plurality of rear vanes (30) positioned in front of the front vanes (20) and arranged on spacers, which are provided on a right side and a left side in the duct housing (10), so as to rotate in the vertical direction, and having interlocking shafts (32) further provided at the rear portions of hinge shafts (31) at one side of the rear vanes;

a vane knob (35) coupled to one of the rear vanes (30) and fitted with one of the front vanes (20) at an adjustment bar provided at the front end of the inside thereof, so as to rotate the rear vanes (30) in the right and left directions and rotate the front vanes (20) in the vertical direction;

a rear vane joint link (40) having rear vane link bars (41) for respectively connecting the interlocking shafts (32) of the plurality of rear vanes (3) so as to enable joint motion, and a rear vane operation bar (42) further assembled into the rear vane link bars (41) in such a manner that one end of the rear vane operation bar (42) is coupled by a pin to the rear vane interlocking shaft (32) at a position in the center of the rear vane link bars (41) and the other end thereof is provided with a rear vane movement pin (42*a*);

a damper joint link (50) having a rotation arm (51), of which one end is assembled into a side surface at the rear portion of the duct housing (10) so as to be coupled to the damper (15) and the other end is assembled into a dial link bar (52), which is positioned in a forward discharge hole direction at the outside of the duct housing (10) and has a damper rotation pin (52*a*) at a front end thereof; and a dial assembly (60) having a dial support member (61) coupled to a side surface at the front portion of the duct housing (10), a dial knob (62) rotatably provided to the inside of the dial support member (61), and a rear vane cam hole (64) and a damper cam hole (65) formed next to each other in the rear surface of the dial knob (62) such that one end of the dial link bar (52) moves along the damper cam hole (65) and the one end of the rear vane operation bar (42), which is connected to the rear vane link bar (41), is coupled to the rear vane cam hole (64), thereby moving the dial link bar (52) and the rear vane link bar (41) by the rotation of the dial knob (62) in the horizontal direction.

2. The air vent for a vehicle according to claim 1, wherein the rear vane cam hole (64) and the damper cam hole (65) are respectively formed to have a damper-closing point (64*a*), (65*a*), a damper-opening point (64*b*), (65*b*) and a rear vane-spreading point (64*c*), (65*c*), such that the dial knob (62) is rotated at the damper-closing point (64*a*), (65*a*), the damper rotation pin (52*a*) is positioned at damper-opening point (65*b*) and moves the dial link bar (52) in the horizontal direction so as to rotate the damper (15), and the rear vane movement pin (42*a*) is placed at the position of the damper-opening point (64*b*) without friction in the rear vane cam hole (64).

3. The air vent for a vehicle according to claim 1, wherein the rear vane cam hole (64) and the damper cam hole (65) are respectively formed to have the damper-closing point (64*a*), (65*a*), the damper-opening point (64*b*), (65*b*) and the rear vane-spreading point (64*c*), (65*c*), and, when the dial knob (62) is rotated in a state, in which the damper rotation pin (52*a*) and the rear vane movement pin (42*a*) are positioned at the damper-opening points (64*b*), (65*b*), the rear vane movement pin (42*a*) is positioned at the rear vane-spreading point (64*c*) and moves the rear vane operation bar (42) in the horizontal direction so as to jointly move the rear vane link bar (41) such that the rear vanes (30) are changed to have symmetrical inclination with respect to the rear vane operation bar (42) and the damper rotation pin (52*a*) is placed at the position of the rear vane-spreading point (65*c*) without friction in the damper cam hole (65).

* * * * *